United States Patent [19]
Chung

[11] Patent Number: 5,587,953
[45] Date of Patent: Dec. 24, 1996

[54] FIRST-IN-FIRST-OUT BUFFER MEMORY

[75] Inventor: Chan H. Chung, Bubaleub, Rep. of Korea

[73] Assignee: Hyundai Electronics Industries Co., Inc., Rep. of Korea

[21] Appl. No.: 499,087

[22] Filed: Jul. 6, 1995

[30] Foreign Application Priority Data

Jul. 6, 1994 [KR] Rep. of Korea ............... 1994-16143

[51] Int. Cl.⁶ .................................................. G11C 7/00
[52] U.S. Cl. ................... 365/220; 365/221; 365/189.07; 365/230.05; 365/236
[58] Field of Search .............................. 365/221, 230.05, 365/236, 220, 189.07, 236, 238.5

[56] References Cited

U.S. PATENT DOCUMENTS

5,426,612  6/1995  Ichige et al. ................ 365/189.07

Primary Examiner—David C. Nelms
Assistant Examiner—F. Niranjan
Attorney, Agent, or Firm—Blakely Sokoloff Taylor & Zafman

[57] ABSTRACT

Disclosed is the FIFO buffer memory, comprising a core memory 12 having a dual port structure, for substantially storing data, first and second address decoders 13 and 14 responsive to read and write clock signals, for producing addresses indicative of directing locations in the core memory when data is written in the core memory or when the data is read from the core memory, and a status detector 15 for generating memory status signals indicating whether the data can be written in the FIFO buffer memory or whether the data can be read from the FIFO buffer memory, i.e. full and empty flags. The buffer memory can be embodied without use of complicated circuits such as address counter, address register and comparator, which can be operated at high speed and embodied with high-density integration.

3 Claims, 10 Drawing Sheets

(PRIOR ART)

FIRST-IN-FIRST-OUT BUFFER MEMORY

BACKGROUND OF THE INVENTION

1. Field of the Invention

The present invention relates to a first-in first-out buffer memory adapted for high speed operation and high-density integration.

2. Description of the Prior Art

First-in first-out (hereinafter, referred to as "FIFO") buffer memory is a memory unit that stores information in such a manner that the item first in is the item first out. A FIFO buffer memory is provided with separate input and output terminals, i.e. a dual port. This buffer memory has two important features, one of which is that it can input data and output data at two different rates, the other of which is that the output data are always in the same order in which the data are entered the buffer memory. When placed between two units having different data transfer rates, the FIFO buffer memory can accept data from the source unit at one rate of transfer and deliver the data to the destination unit at another rate. If the source unit is slower than the destination unit, the buffer memory can be filled with data at a slow rate and later emptied at the higher rate. If the source unit is faster than the destination unit, the buffer memory is useful those cases where the source data arrives in bursts that fill out the buffer but the time between bursts is long enough for the destination unit to empty some or all the information from the buffer. Thus, a FIFO buffer memory can be useful in some applications when data is transferred asynchronously.

For example, if there is no FIFO buffer memory between two units having different rates of transfer and a direct connection is made between them, there is a problem on an interface therebetween that the source unit waits to receive data from the destination unit until the destination unit completes its working job. In order to eliminate the problem, a FIFO buffer memory is frequently used between the two units to achieve a time buffering function therebetween.

Figure 1A:
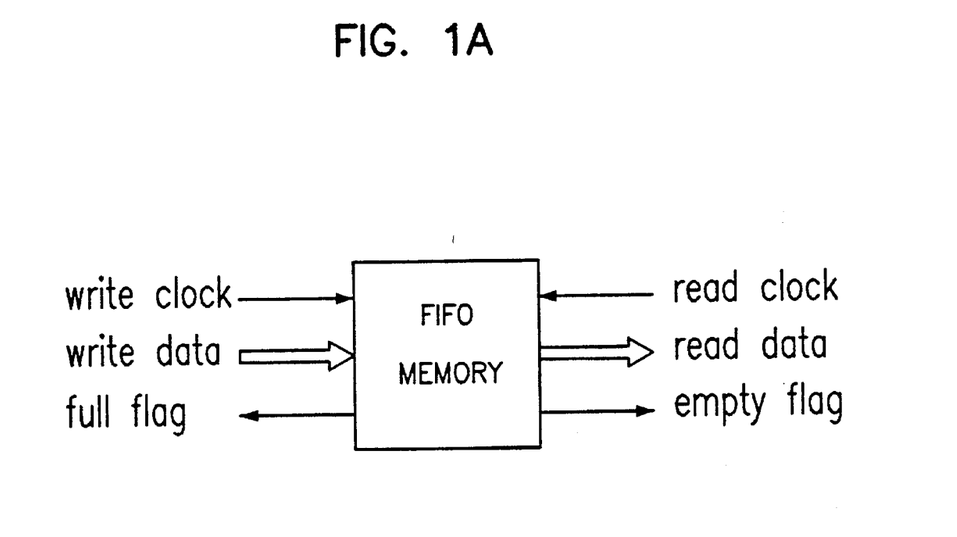
FIG. 1A is a schematic block diagram showing a relationship between a prior art FIFO buffer memory and system clock signals for data transfer.
Figure 1B:
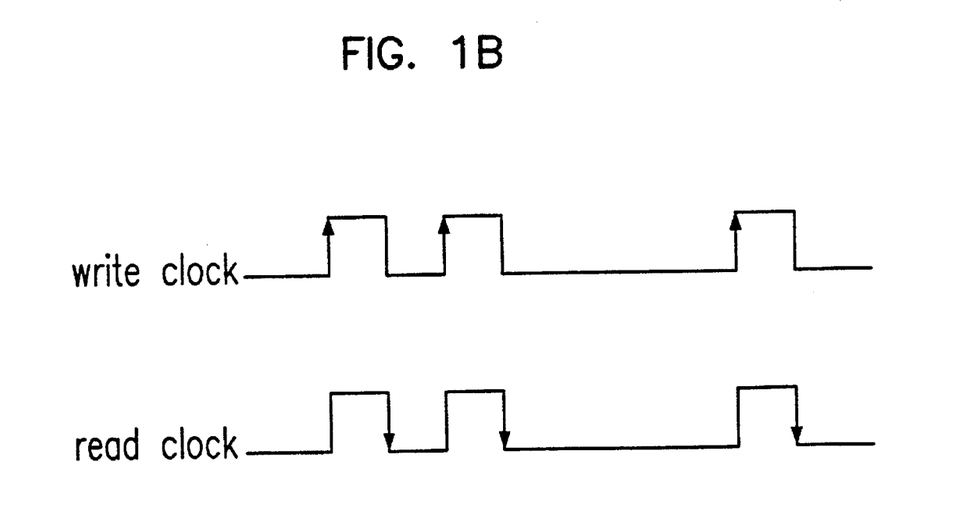
FIG. 1B is a diagram showing waveforms of write and read clock signals which are applied to the prior art FIFO buffer memory of FIG. 1A.

FIG. 1A shows a relationship between a prior art FIFO buffer memory and system clock signals for data transfer. As shown in FIG. 1A, since the FIFO buffer memory has a dual port, read and write operations are simultaneously performed while one of the clock system signals is activated. Because of this reason, the FIFO buffer memory has been used in some applications. For example, the FIFO buffer memory may be used in the interface apparatus between systems, the interface apparatus between block units having different rates of transfer, an apparatus for transforming serial data into parallel data, an apparatus for transforming parallel data into serial data, or the like. Also, it can be seen from FIG. 1B that, in the FIFO buffer memory, the write operation is performed during a leading edge (i.e. rising edge) of the clock signal as one of non-data signals and the read operation is performed during a trailing edge (i.e. falling edge) of the clock signal.

Figure 2:
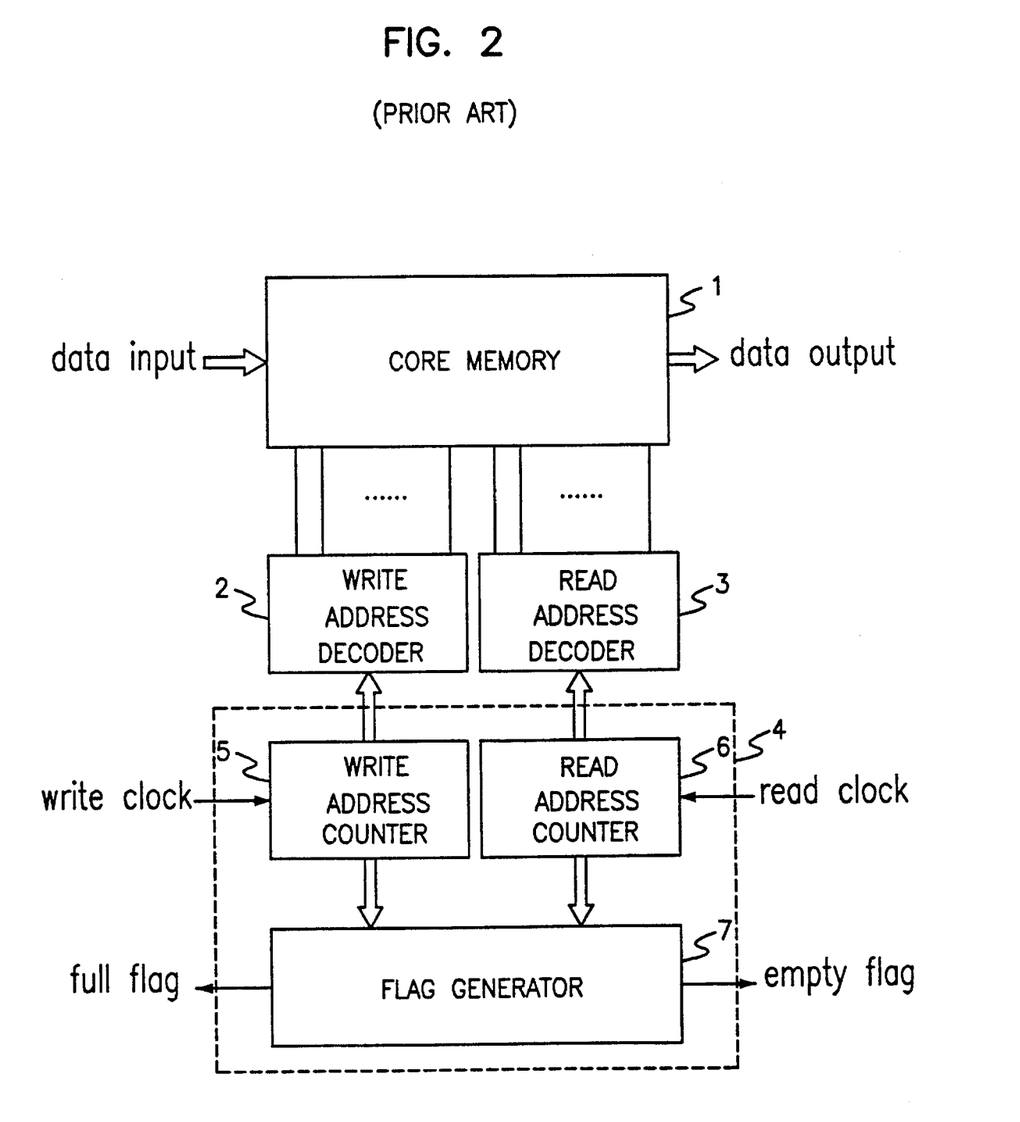
FIG. 2 is an overall block diagram showing the construction of the prior art FIFO buffer memory shown in FIG. 1A.

FIG. 2 is an overall block diagram showing the construction of a prior art FIFO buffer memory shown in FIG. 1.

Referring to FIG. 2, the FIFO buffer memory comprises a core memory 1 having a dual port, for substantially storing a binary-coded information (hereinafter, referred to as "data"), address counters 5 and 6 for producing addresses directing locations in the core memory 1 when writing of data to the core memory or reading of data from the core memory is performed, and a flag generator 7 for generating memory status flags. The addresses are provided as read and write addresses to the core memory 1. In the prior art FIFO buffer memory, the flag generator 7 and the address counters 5 and 6 constitutes a control logic 4. The flag generator 7 generates two flags indicative of conditions of memory status, one of which is a full flag indicating that the core memory 1 is full and can not input additional data, and the other of which is an empty flag indicating that the core memory 1 is not full, i.e. empty, and can input the additional data. As the core memory 1, registers or SRAM's (Static Random Access Memories) are mainly used, because the FIFO buffer memory is provided with a collection of storage registers, together with the associated circuits needed to transfer information in and out of the registers.

Figure 3:
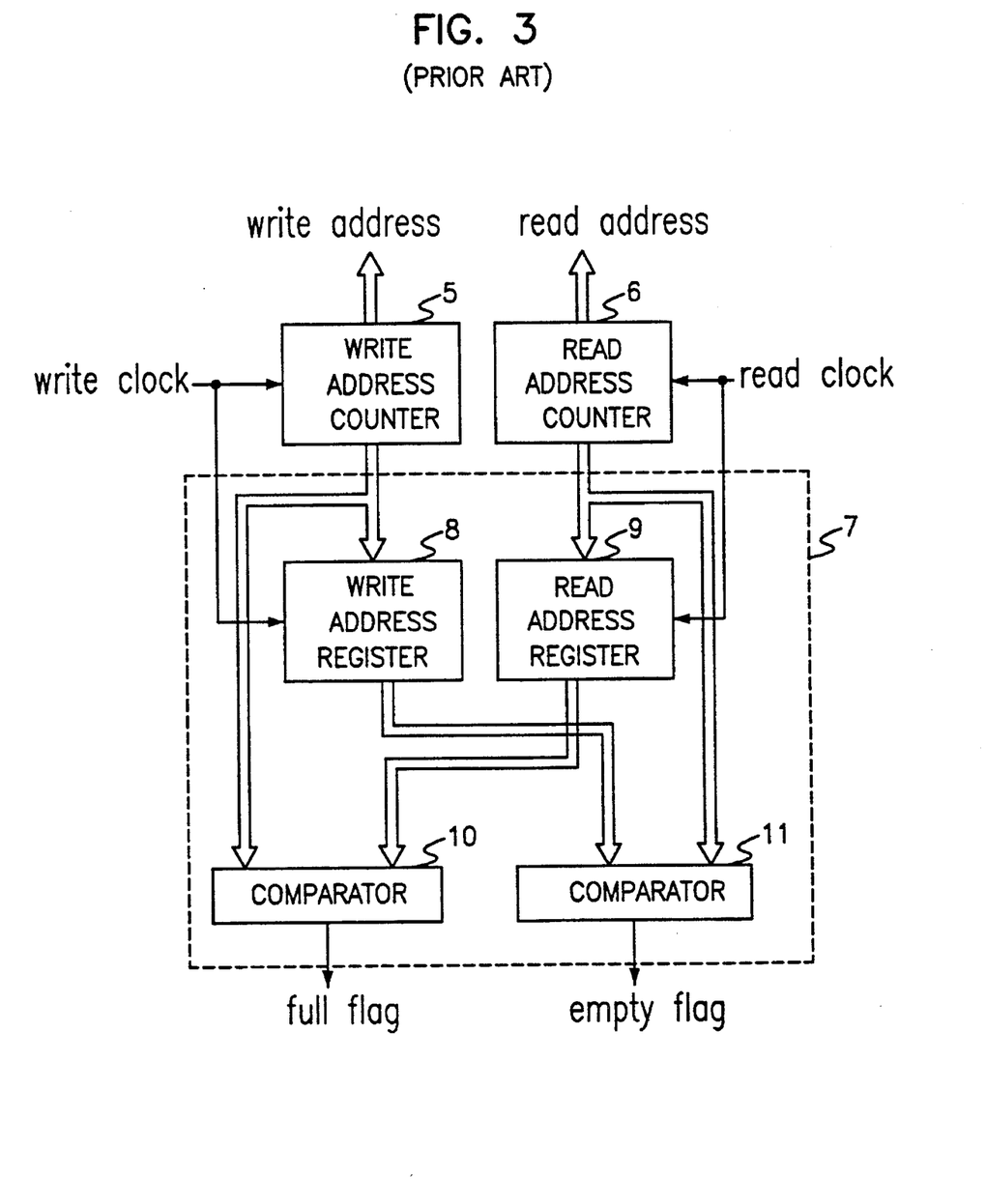
FIG. 3 is a detailed circuit diagram of the control logic shown in FIG. 2.

FIG. 3 is a detailed circuit diagram of the control logic 4 shown in FIG. 2.

With reference to FIG. 3, the flag generator 7 has address registers 8 and 9 for temporarily storing address signals supplied from the counters 5 and 6, respectively, a comparator 10 for comparing the output of the write address counter 5 with the output of the read address register 9 to output the full flag and another comparator 11 for comparing the output of the read address counter 6 with the output of the write address register 8 to output the empty flag. Thus, the status of the FIFO buffer memory can be indicated by the full and empty flags.

However, since the prior art FIFO buffer memory is provided with address counters, address registers and comparators, as shown in FIGS. 2 and 3, there are some problems that a size thereof is larger and thus an operating speed thereof is lowered.

Particularly, in case that the number of memory addresses is increased in the FIFO buffer memory, the control logic 4 embodied in the buffer memory is complicated. This causes the same problems as those of low operating speed and larger size thereof.

SUMMARY OF THE INVENTION

It is an object of the present invention to provide a FIFO buffer memory in which a control logic is further simplified in construction, as compared to the prior art FIFO buffer memory, so as to improve operating speed of the memory and reduce a size thereof.

It is the other object of the present invention to provide a FIFO buffer memory in which a control logic can be embodied without use of address counters, address registers and comparators so as to achieve a high-speed operation of the memory and to have a high-density integration thereof.

The first-in first-out buffer memory according to the aspect of the present invention comprises a core memory having a dual port, for substantially storing data; first and second address decoders responsive to read and write clock signals, for producing addresses indicative of directing a location in the core memory when data is written in the core memory or when the data is read from the core memory; and a status detector for generating memory status signals indicating whether the data can be written in the core memory or whether the data can be read from the core memory.

In this embodiment, said status detector comprises first and second flip-flops for providing input signals thereof to output terminals thereof in accordance with the write and read clock signals, respectively, each having a clear terminal and a clock terminal; a multiplexer for receiving the output signals of the flip-flops and selecting one of them in response to a selection control signal; a phase detector for generating the selection control signal in response to the write and read clock signals to control selecting operation of the multiplexer; a first AND gate for receiving output data of the multiplexer and generating a full flag on the basis of AND logic function thereof; a NOR gate for receiving the output data of the multiplexer and generating an empty flag on the basis of NOR logic function thereof; an increment circuit for incrementing the output data of the multiplexer by one and providing incremented signal to the input of the first flip-flop; and a decrement circuit for decrementing the output data of the multiplexer by one and providing decremented signal to the input of the second flip-flop.

In the buffer memory, each of said address decoders comprises a plurality of flip-flops, each flip-flop having one input, one output and one clock terminal, and wherein each of the flip-flops is preset or cleared in response to an externally applied clear signal and provides an input signal thereof to the output thereof in accordance with the write and read clock signal.

In the buffer memory, said phase detector comprises a third flip-flop having an input terminal connected to a source voltage supply, for generating a high or low level signal in synchronizing with the write clock signal, a fourth flop-flop having an input terminal connected to a ground, for generating a high or low signal in synchronizing with the read clock signal, a second AND gate for receiving output of the third flip-flop 24 and the clear signal and providing a preset control signal generated on the basis of AND logic function thereof to a preset terminal of the fourth flip-flop, and a third AND gate for receiving output of the fourth flip-flop and the clear signal and providing a clear control signal generated on the basis of AND logic function thereof to a clear terminal of the first flip-flop.

BRIEF DESCRIPTION OF THE DRAWINGS

This invention may be better understood and its object will become apparent to those skilled in the art by reference to the accompanying drawings as follows.

DESCRIPTION OF THE PREFERRED EMDODIMENT(S)

Figure 4:
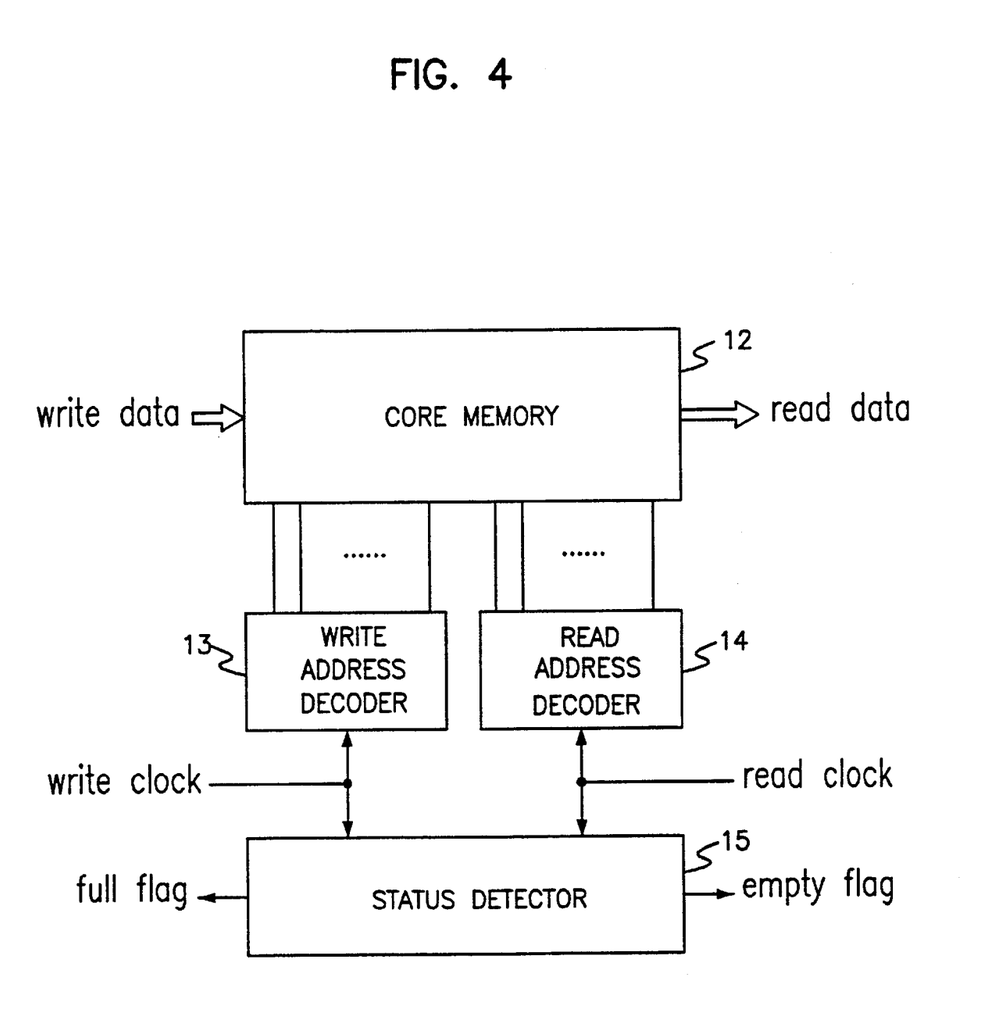
FIG. 4 is an overall block diagram showing the construction of a FIFO buffer memory according to the present invention.

Referring to FIG. 4, the novel FIFO buffer memory in accordance with the present invention has a core memory 12 having a dual port structure, for substantially storing data, first and second address decoders 13 and 14 responsive to read and write clock signals, for producing addresses indicative of directing locations in the core memory 12 when the data is written in the core memory 12 or when the data is read from the core memory 12, and a status detector 15 for generating memory status signals indicating whether the data can be written in the FIFO buffer memory or whether the data can be read from the FIFO buffer memory, i.e. full and empty flags.

Figure 5:
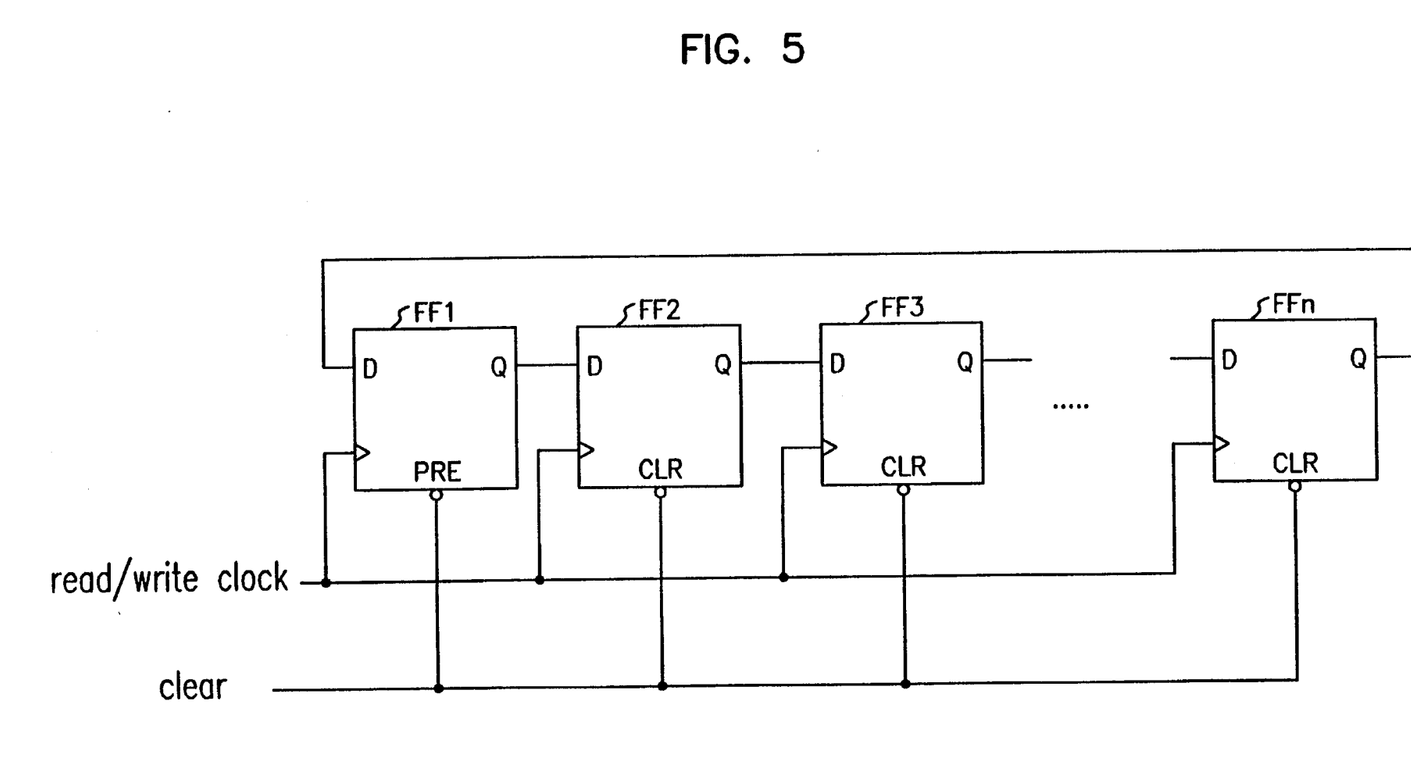
FIG. 5 is a detailed circuit diagram of the address decoder shown in FIG. 4.

Each of the first and second address decoders 13 and 14, as shown in FIG. 5, has a plurality of flip-flops FF1 through FFn. Each flip-flop has one input D, one output Q and one clock terminal. The first flip-flop FF1 further has a preset terminal PRE and each of other flop-flops FF2 through FFn further has a clear terminal CLR. The flip-flops FF1 through FFn are arranged in such a manner that the output of a previous flip-flop is connected to the input of the next flip-flop and the output of the final flip-flop FFn is connected to the input of the first flip-flop FF1. Each of the flip-flops is preset or cleared in response to an externally applied clear signal and allows an input signal thereof to be provided to an output terminal thereof in accordance with a read/write clock signal.

Figure 6:
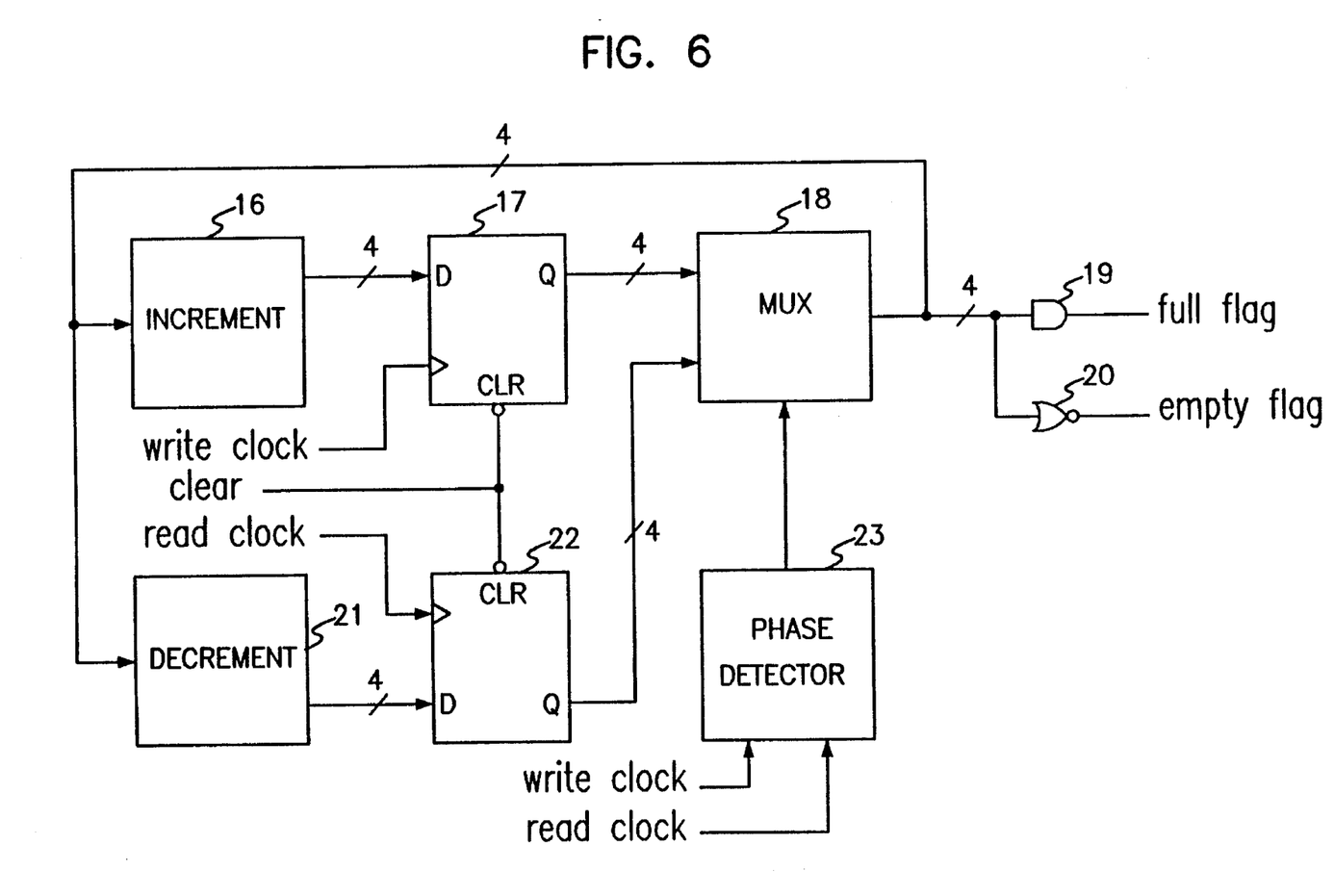
FIG. 6 is a detailed circuit diagram of the status detector shown in FIG. 4.

The status detector 15, as shown in FIG. 6, comprises two flip-flops 17 and 18 each having a clear terminal CLR and a clock terminal, and a multiplexer 18 for receiving output signals of the flip-flops 17 and 18 and selecting one of them in response to a selection control signal. Also, the status detector 15 further comprises a phase detector 23 for generating the selection control signal in response to write and read clock signals, an AND gate 19 for receiving the output of the multiplexer 18 and generating a full flag on the basis of AND logic function thereof, a NOR gate 20 for receiving the output of the multiplexer 18 and generating an empty flag on the basis of NOR logic function thereof, an increment circuit 16 for incrementing the output of the multiplexer 18 by one and providing the incremented signal to the input D of the first flip-flop 17, and a decrement circuit 21 for decrementing the output of the multiplexer 18 by one and providing the decremented signal to the input D of the second flip-flop 22. The first and second flip-flops 17 and 18 are synchronized with the write and read clock signals, respectively.

Figure 7:
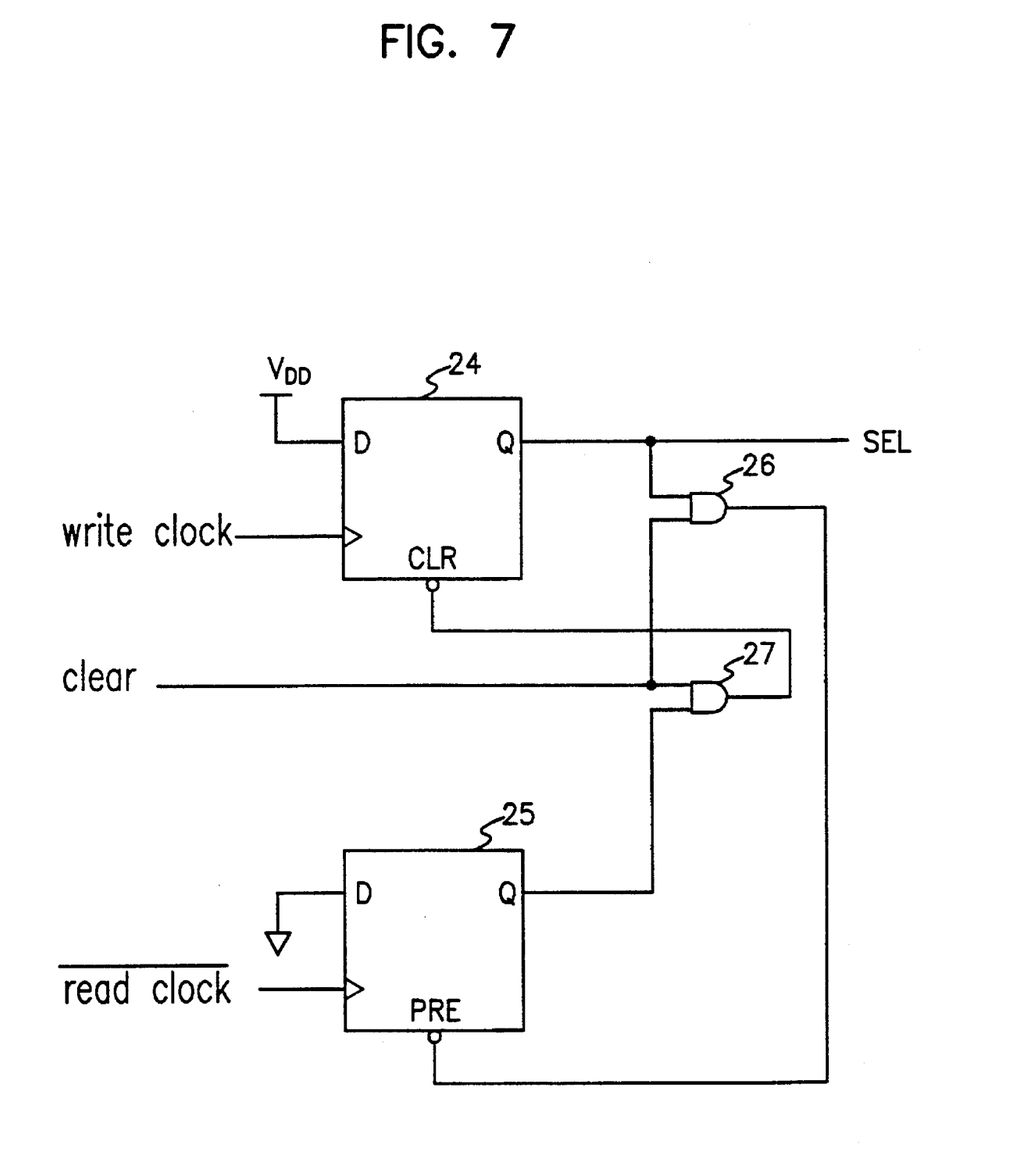
FIG. 7 is a detailed circuit diagram of the phase detector shown in FIG. 4.

The phase detector 23, as shown in FIG. 7, has a third flip-flop 24 having an input terminal connected to a source voltage supply, for generating a high or low level signal in synchronizing with the write clock signal, a fourth flop-flop 25 having an input terminal connected to a ground, for generating a high or low signal in synchronizing with the read clock signal, a second AND gate 26 for receiving the output of the third flip-flop 24 and an externally applied clear signal and providing a preset control signal generated on the basis of AND logic function to the present terminal PRE of the fourth flip-flop 25, and a third AND gate 27 for receiving the output of the fourth flip-flop 25 and the clear signal and providing a clear control signal generated on the basis of AND logic function to the clear terminal of the flip-flop 24. Also, the output of the third flip-flop 24 is used as the selection control signal for the multiplexer 18. The output of the multiplexer 18 is composed of 4-bit data, i.e. $b_0 b_1 b_2 b_3$.

Figure 9:
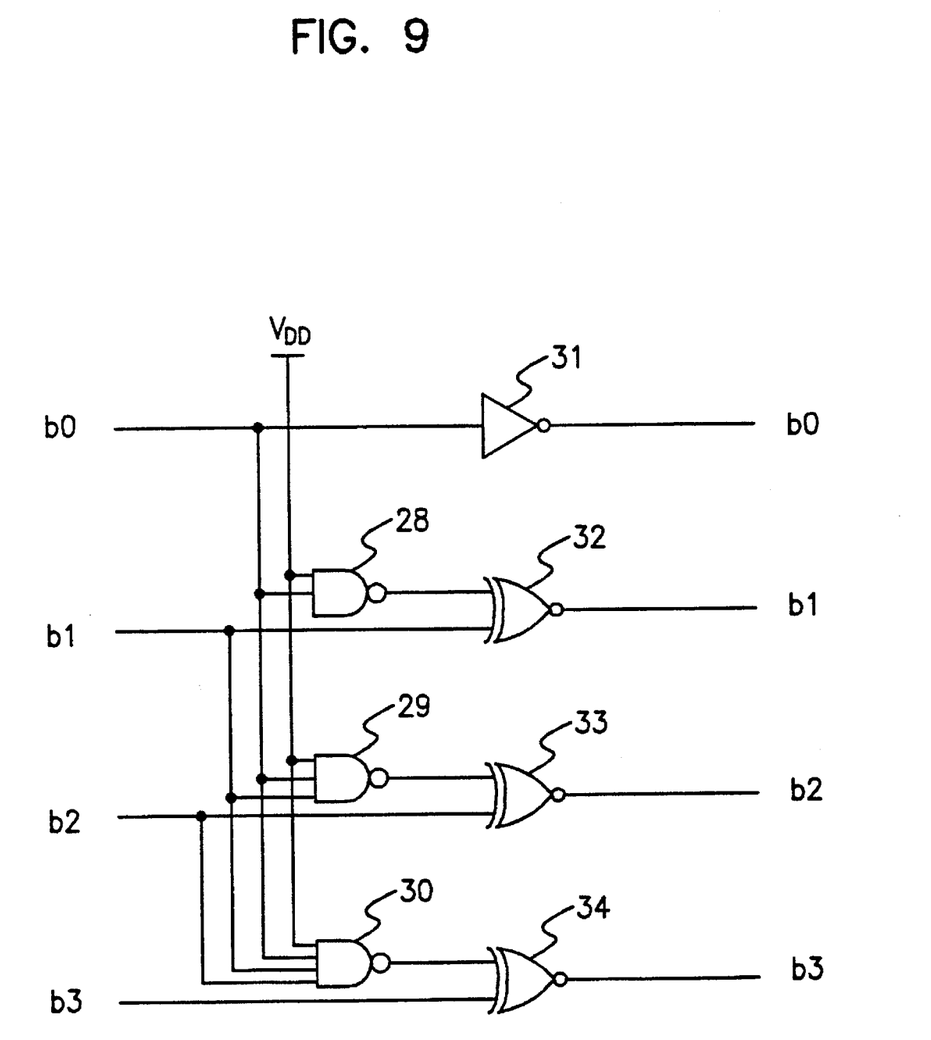
FIG. 9 is a detailed circuit diagram of the increment circuit of FIG. 6.

The increment circuit 16 of FIG. 6, as shown in FIG. 9, has an invertor 31 for inverting a least significant bit (hereinafter, referred to as "LSB") $b_0$ of the 4-bit signal from the multiplexer 18, a first NAND gate 28 for receiving the LSB $b_0$ and a level signal corresponding to the source voltage $V_{DD}$ and generating a logic signal on the basis of NAND logic function thereof, a second NAND gate 29 for receiving a bit signal $b_1$ of the 4-bit data in addition to the inputs of the first NAND gate 28 and generating a logic signal on the basis of NAND logic function thereof, and a third NAND gate 30 for receiving a bit signal $b_2$ of the 4-bit data in addition to the inputs of the second gate 29 and generating a logic signal on the basis of NAND logic function thereof. The increment circuit 16 further comprises exclusive-NOR gates 32 through 34 for receiving logic signals from the NAND gates and the bit signals $b_1$ through $b_3$ and generating output bit signals on the basis of exclusive-NOR logic function, respectively.

Figure 10:
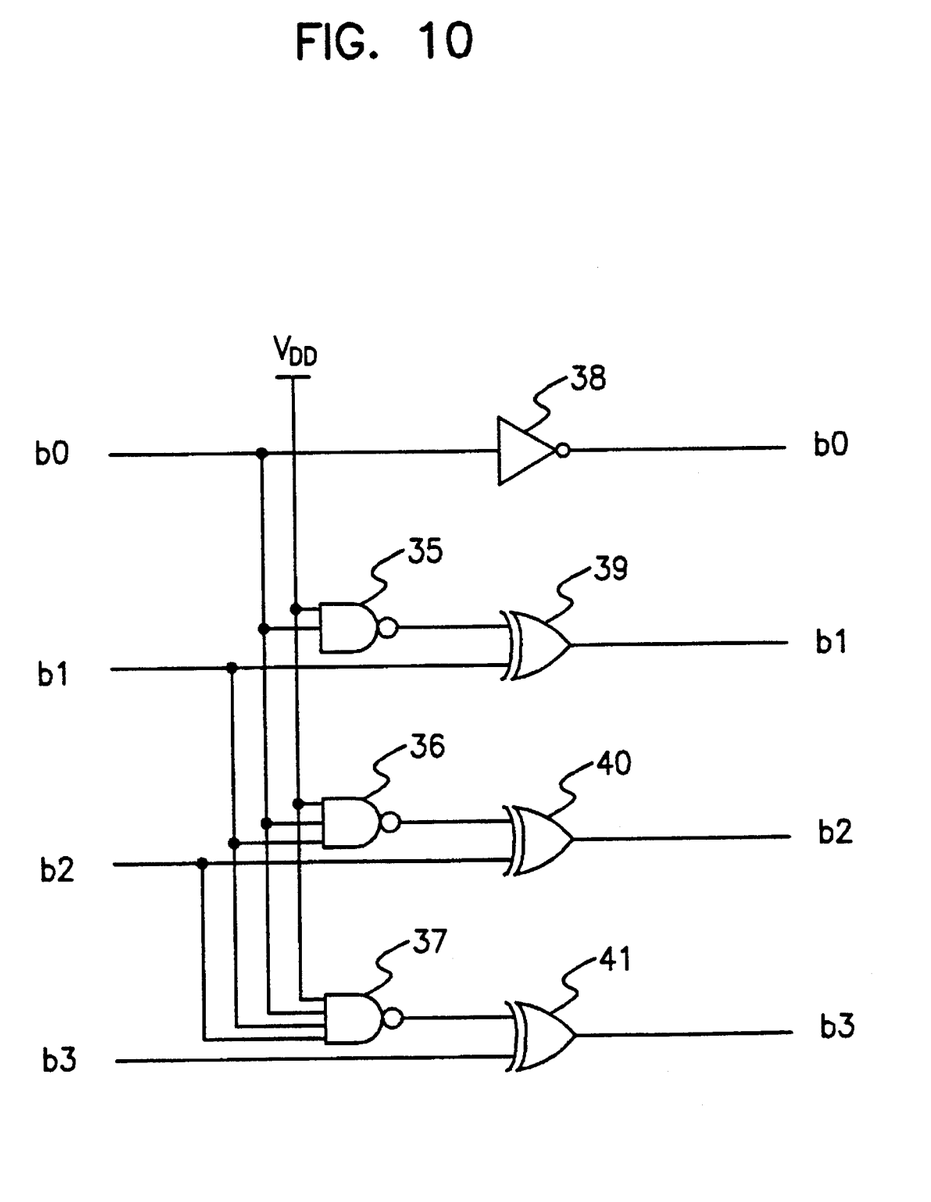
FIG. 10 is a detailed circuit diagram of the decrement circuit of FIG. 6.

The decrement circuit 21 of FIG. 6, as shown in FIG. 10, has an inverter 38 for inverting the least significant bit (hereinafter, referred to as "LSB") $b_0$ of the 4-bit signal from the multiplexer 18, a fourth NAND gate 35 for receiving the LSB $b_0$ and a level signal corresponding to the source voltage $V_{DD}$ and generating a logic signal on the basis of NAND logic function thereof, a fifth NAND gate 36 for receiving a bit signal $b_1$ of the 4-bit data in addition to the inputs of the fourth NAND gate 35 and generating a logic signal on the basis of NAND logic function thereof, and a sixth NAND gate 37 for receiving a bit signal $b_2$ of the 4-bit data in addition to the inputs of the fifth gate 36 and generating a logic signal on the basis of NAND logic function thereof. The decrement circuit 21 further comprises exclusive-OR gates 39 through 41 for receiving logic signals from the NAND gates 35 through 37 and the bit signals $b_1$ through $b_3$ and generating output bit signals on the basis of exclusive-OR logic function, respectively.

Hereinafter, the operation of the FIFO buffer memory and the effects caused thereby will be described with reference to FIGS. 4 to 10.

First, when the clear signal of low level (shown in FIG. 8) is applied to the FIFO buffer memory, the flip-flop FF1 of FIG. 5 and the flip-flop 25 of FIG. 7 are preset to maintain both the outputs thereof at high level, i.e. "1", and then the flip-flops FF2 through FFn and 24 are cleared to maintain all the outputs thereof at low level, i.e. "0". Thus, the memory address of "00..0" is specified by the address decoders 13 and 14 and the status detector outputs the full flag of 0 and the empty flag of 1. This state indicates that data can be written in the core memory 1 and there are no data to be read from the core memory 1. As described above, the FIFO buffer memory is initialized by the clear signal of low level to output the empty flag indicative of writing data therein.

Figure 8:
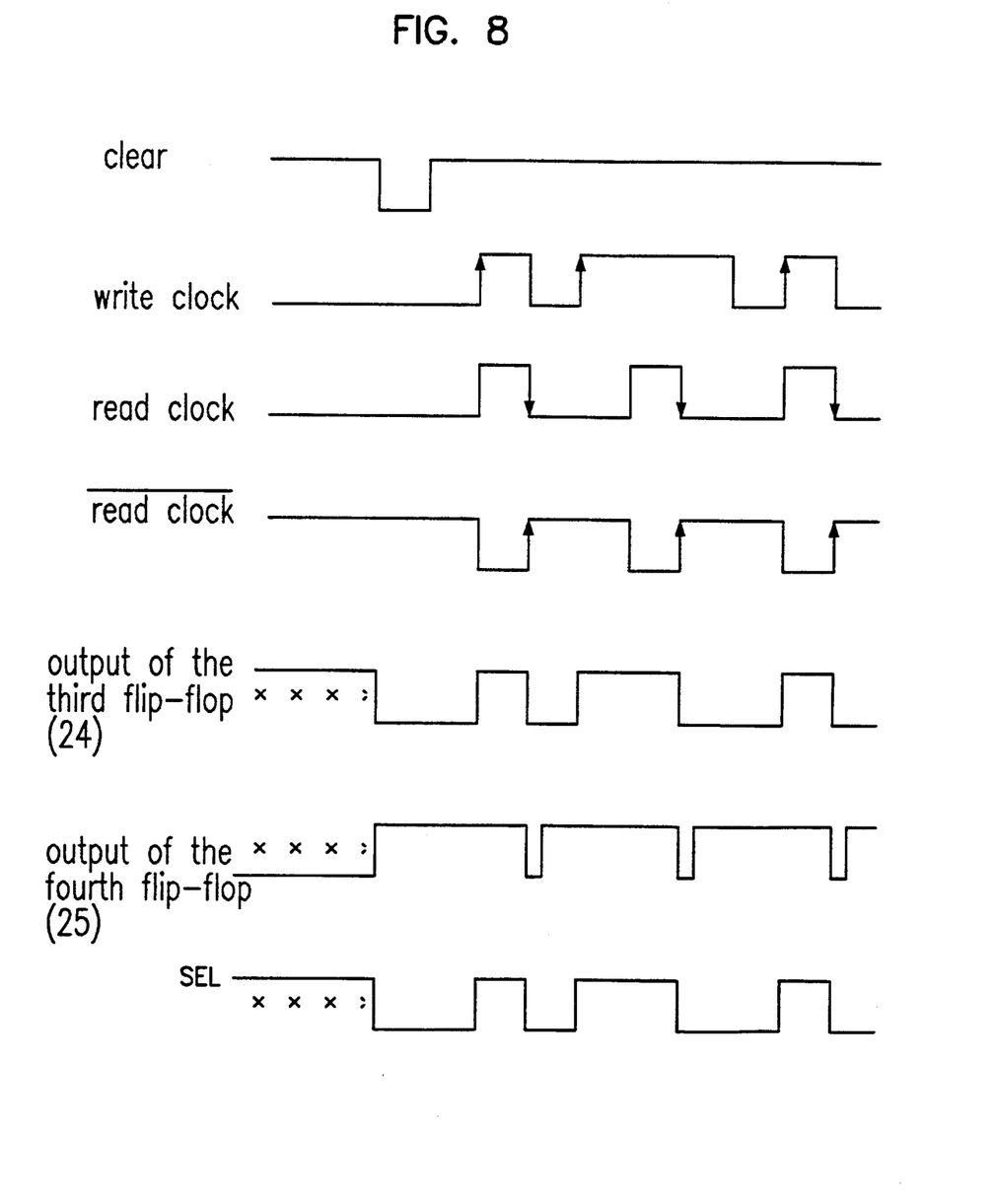
FIG. 8 is a diagram showing waveforms of various signals appearing in the phase detector of FIG. 7.

At this state, the write clock signal from an external system can be applied to the FIFO buffer memory so as to store data in the memory. By providing the write clock signal to the FIFO buffer memory, data can be stored in a location of the core memory 1 specified by the memory address of "00..0" during a rising edge of the write clock signal, as shown in FIG. 8. Also, the memory address is incremented to "00..1" during a falling edge of the write clock signal.

On the other hand, in the status detector 15 outputs, the 4-bit output "0000" of the multiplexer 18 is applied to the increment circuit 16 to be incremented to "0001". The incremented data "0001" are applied to the inputs of the first AND gate 19, and thus the full flag of 0 is generated from the gate 19, which is indicative of writing data in the core memory 1. Then the selection control signal SEL for the multiplexer 18 is generated from the phase detector 23 in accordance with the read/write clock signal, as shown in FIG. 8. The selection control signal SEL is supplied to the multiplexer 18 to select one of the incremented data and the decremented data.

If the selection control signal SEL is 1, the multiplexer 18 outputs the incremented data from the increment circuit 16. If the selection control signal is 0, the multiplexer 18 outputs the decremented data from the decrement circuit 21. As described above, when the write clock signal is applied in the buffer memory, the incremented data is generated from the increment circuit 16, and when the read clock signal is applied therein, the decremented data is generated from the decrement circuit 21.

If the 4-bit output of the multiplexer 18 is "0000", the empty flag becomes 1 by means of the NOR gate 20 and thereby reading operation of the buffer memory is unable to be performed. If the 4-bit output of the multiplexer 18 is "1111", the full flag becomes 1 and thereby writing operation of the buffer memory is unable to be performed.

Because the status detector 15 and the address decoders 13 and 14 constitutes the construction capable of writing data to the core memory and reading data therefrom on the basis of detecting the status of address, they may be applied to an image data processing system which has a line memory capable of storing image data corresponding to one scan line and sequentially reading it therefrom.

According to the present invention, because the FIFO buffer memory can be embodied without use of address counters, address registers and comparators, a control logic is simplified in hardware construction.

Furthermore, the FIFO buffer memory also can be simplified owing to the simplified control logic, and therefore it can be operated at high speed and embodied with high-density integration.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A first-in first-out buffer memory comprising:

a core memory having a dual port, for substantially storing data;

first and second address decoders responsive to read and write clock signals, for producing addresses indicative of directing a location in the core memory, when data is written in the core memory, or when the data is read from the core memory; and a status detector for generating memory status signals indicating whether the data can be written in the core memory or whether the data can be read from the core memory, said status detector comprising, first and second flip-flops for providing input signals thereof to output terminals thereof in accordance with the write and read clock signals, respectively, each having a clear terminal and a clock terminal;

a multiplexer for receiving the output signals of the flip-flops and selecting one of them in response to a selection control signal;

a phase detector for generating the selection control signal in response to the write and read clock signals to control selecting operation of the multiplexer;

a first AND gate for receiving output data of the multiplexer and generating a full flag on the basis of AND logic function thereof;

a NOR gate for receiving the output data of the multiplexer and generating an empty flag on the basis of NOR logic function thereof;

an increment circuit for incrementing the output data of the multiplexer by one and providing incremented signal to the input of the first flip-flop; and a decrement circuit for decrementing the output data of the multiplexer by one and providing decremented signal to the input of the second flip-flop.

2. The first-in first-out buffer memory as defined in claim 1, wherein each of said address decoders comprises a plurality of flip-flops, each flip-flop having one input, one output and one clock terminal, and wherein each of the flip-flops is preset or cleared in response to an externally applied clear signal and provides an input signal thereof to the output thereof in accordance with the write and read clock signal.

3. The first-in first-out buffer memory as defined in claim 1, wherein said phase detector comprises a third flip-flop having an input terminal connected to a source voltage supply, for generating a high or low level signal in synchronizing with the write clock signal, a fourth flop-flop having an input terminal connected to a ground, for generating a high or low signal in synchronizing with the read clock signal, a second AND gate for receiving output of the third flip-flop and the clear signal and providing a preset control signal generated on the basis of AND logic function thereof to a preset terminal of the fourth flip-flop, and a third AND gate for receiving output of the fourth flip-flop and the clear signal and providing a clear control signal generated on the basis of AND logic function thereof to a clear terminal of the first flip-flop.

* * * * *

UNITED STATES PATENT AND TRADEMARK OFFICE
CERTIFICATE OF CORRECTION

PATENT NO. : 5,587,953
DATED : December 24, 1996
INVENTOR(S) : Chung It is certified that error appears in the above-identified patent and that said Letters Patent is hereby corrected as shown below:

In column 5 at line 41, please delete " detector " and insert -- detector 15--.

Signed and Sealed this

Seventh Day of October, 1997

*Attest:*

BRUCE LEHMAN

*Attesting Officer*     Commissioner of Patents and Trademarks